US012632911B2

(12) United States Patent
Beaty et al.

(10) Patent No.: US 12,632,911 B2
(45) Date of Patent: May 19, 2026

(54) OFF-CHAIN ABSTRACTION MECHANISM FOR DISTRIBUTING NON-FUNGIBLE TOKENS IN AN EDUCATIONAL ENVIRONMENT

(71) Applicant: RedCritter Corp., Flower Mound, TX (US)

(72) Inventors: Robert M. Beaty, Flower Mound, TX (US); Randy M. Whelan, Coppell, TX (US); Erika D. Lambert, Flower Mound, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 777 days.

(21) Appl. No.: 17/703,444

(22) Filed: Mar. 24, 2022

(65) Prior Publication Data

US 2023/0306543 A1 Sep. 28, 2023

(51) Int. Cl.
*G06Q 50/20* (2012.01)
*H04L 9/32* (2006.01)

(52) U.S. Cl.
CPC ........... *G06Q 50/20* (2013.01); *H04L 9/3236* (2013.01)

(58) Field of Classification Search
CPC .............................. G06Q 50/20; H04L 9/3236
USPC ......................................................... 705/59
See application file for complete search history.

(56) References Cited

U.S. PATENT DOCUMENTS

| | | | |
|---|---|---|---|
| 10,373,158 B1 * | 8/2019 | James | G06Q 40/04 |
| 2015/0324764 A1 * | 11/2015 | Van Rooyen | G06Q 20/02 705/69 |
| 2017/0005804 A1 * | 1/2017 | Zinder | H04L 9/3239 |
| 2019/0050832 A1 * | 2/2019 | Wright | H04L 9/3073 |

* cited by examiner

Primary Examiner — John W Hayes
Assistant Examiner — Cristina Owen Sherr
(74) Attorney, Agent, or Firm — Kirton McConkie; Brian Tucker

(57) ABSTRACT

An off-chain abstraction mechanism for distributing NFTs in an educational or similar environment is provided. The off-chain abstraction mechanism abstracts away required knowledge and activities that are directly involved in the issuance to and collection of NFTs both on and off-chain by students thereby allowing teachers to focus simply on rewarding desired behaviors by issuing digital coins to students. Teachers can distribute digital coins to students that are grouped into teams as part of a game or challenge. Digital coins can be associated with a point value that can be added to a team's score during a round of the game. A school administrator can declare a round complete at which point the teams' scores can be used to identify one or more winning teams. Off-chain NFTs can then be distributed to the students of a winning team. The students may view their off-chain NFTs at any time. Also, students desiring to do so may redeem an off-chain NFT for a matching on-chain NFT. A voucher mechanism can be implemented to prevent students from minting NFTs that they have not earned.

10 Claims, 15 Drawing Sheets

OFF-CHAIN ABSTRACTION MECHANISM FOR DISTRIBUTING NON-FUNGIBLE TOKENS IN AN EDUCATIONAL ENVIRONMENT

CROSS-REFERENCE TO RELATED APPLICATIONS

N/A

BACKGROUND

Schools and other educational/learning institutions struggle to maintain student engagement and promote successful learning outcomes. The pandemic has exacerbated such struggles. For example, students oftentimes lack motivation to learn remotely. Also, teachers oftentimes lack the time to adequately master remote learning solutions and therefore cannot invest time to learn additional solutions for promoting student engagement.

People, including students and teachers, are increasingly interested in digital collectibles and particularly blockchain-based non-fungible tokens (NFTs). However, NFTs and their management via blockchain wallets are highly complex and technical. Most students and even many teachers simply cannot understand NFTs. Therefore, NFTs usually fail to enhance student engagement.

BRIEF SUMMARY

The present invention extends to an off-chain abstraction mechanism for distributing NFTs in an educational or similar environment. The off-chain abstraction mechanism abstracts away required knowledge and activities that are directly involved in the issuance to and collection of NFTs both on and off-chain by students thereby allowing teachers to focus simply on rewarding desired behaviors by issuing digital coins to students.

Teachers can distribute digital coins to students that are grouped into teams as part of a game or challenge. Digital coins can be associated with a point value that can be added to a team's score during a round of the game. A school administrator can declare a round complete at which point the teams' scores can be used to identify one or more winning teams. Off-chain NFTs can then be distributed to the students of a winning team. The students may view their off-chain NFTs at any time. Also, students desiring to do so may redeem an off-chain NFT for a matching on-chain NFT. A voucher mechanism can be implemented to prevent students from minting NFTs that they have not earned.

In some embodiments, the present invention may be implemented as method for managing NFTs. A request to redeem an off-chain NFT for an on-chain NFT can be received from a client device that a student uses. A voucher can be created for the off-chain NFT. The voucher can be provided to the client device. A smart contract can receive the voucher from the client device. The smart contract can then verify the voucher and mint the on-chain NFT.

In some embodiments, the present invention may be implemented as computer storage media storing computer executable instructions which when executed implement a method for distributing NFTs. An off-chain NFT can be awarded to each of a plurality of students including awarding a first off-chain NFT to a first student of the plurality of students. A request to redeem the first off-chain NFT for an on-chain NFT can be received from the first student. A voucher can be generated for the first off-chain NFT. The voucher may include a hash signature and a voucher ID. The voucher can be provided to a client device used by the first student. A smart contract can receive the voucher from the client device used by the first student. The smart contract can then use the hash signature and the voucher ID included in the voucher to verify that the first student is authorized to redeem the first off-chain NFT for an on-chain NFT. The smart contract can then mint the on-chain NFT.

In some embodiments, the present invention may be in the form of a method for implementing an off-chain abstraction mechanism for distributing NFTs in an educational environment. A smart contract can be deployed in a blockchain network. In response to a request from a client device to redeem an off-chain NFT for an on-chain NFT, a voucher can be created. The voucher can be provided to the client device. The smart contract can receive the voucher from the client device. The smart contract can then authenticate the voucher and mint the on-chain NFT.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "school" will be used to represent any educational or learning institute that may use a system that is configured in accordance with one or more embodiments of the present invention. The term "student" will be used to represent an individual that may attend or otherwise participate in a school for educational or learning purposes. The term "teacher" will be used to represent an individual that teaches at a school. The term "admin" will be used to represent an individual that administrates a system for a school. Students, teachers, and admins may be considered users of the system. The term "coin" can represent any digital representation that can be awarded to students.

Figure 1:
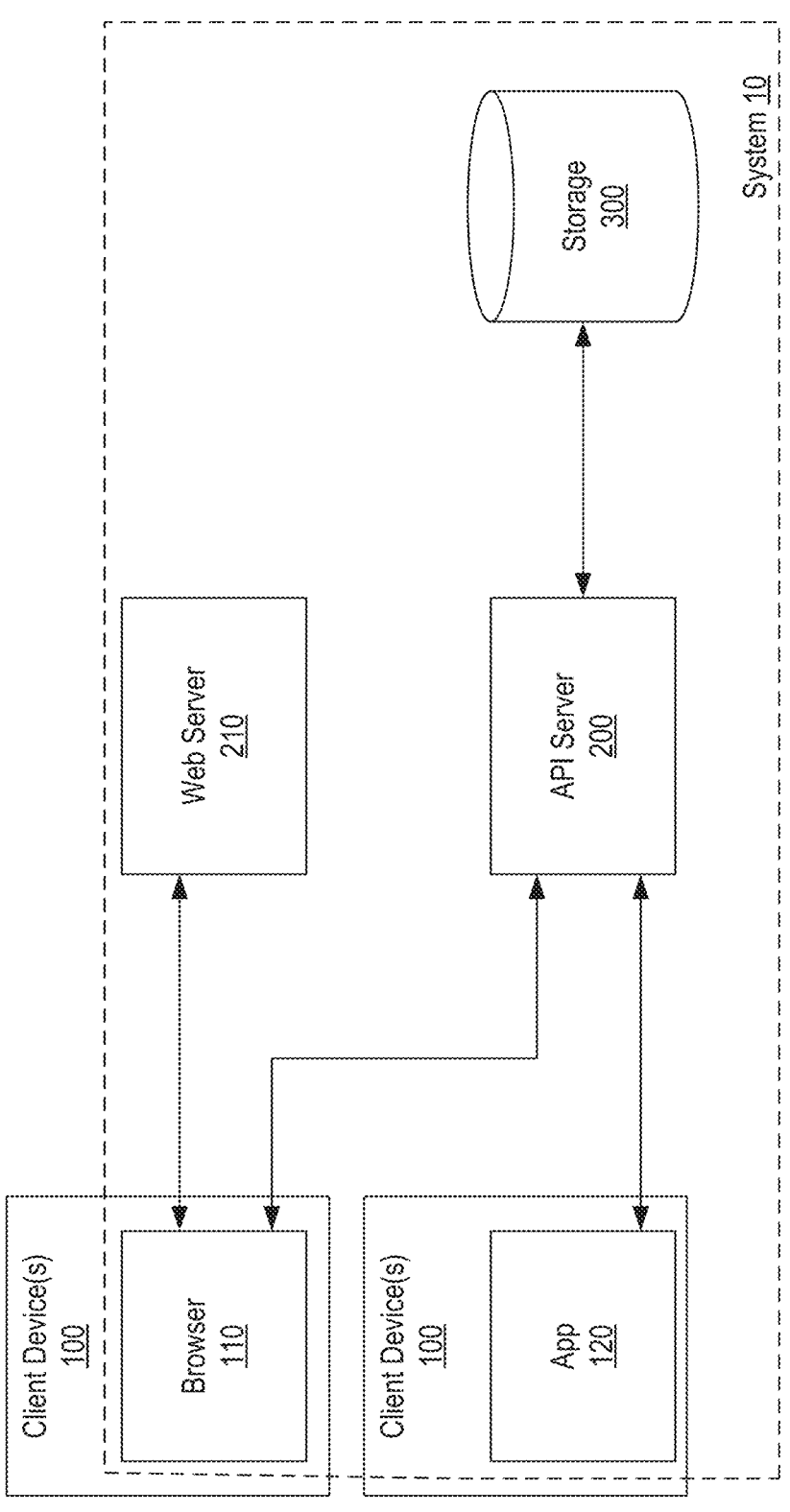
FIG. 1 illustrates an example computing environment in which one or more embodiments of the present invention may be implemented.

FIG. 1 provides an example of a computing environment in which embodiments of the present invention may be implemented. This environment includes a system 10 for integrating NFTs into an educational environment and that provides an off-chain abstraction mechanism for distributing NFTs in the educational environment. System 10 may include an API server 200, possibly a web server 210, and storage 300. Users of client devices 100 may use a browser 110 to access web-based content provided by web server 210 and/or may use an app 120. In either case, the web-based content hosted in browser 110 or app 120 may interface with API server 200.

API server 200 can provide a number of APIs by which client devices 100 can interface with system 10 to implement functionality described herein. In this context, the term API should be construed broadly as encompassing any type of communication that is suitable for performing the functionality described herein. Likewise, the term API server should be construed as encompassing any service that is capable of performing the functionality described herein.

Storage 300 can represent any type or number of storage mechanisms for storing the data structures that system 10 may use to provide the functionality described below. For example, storage 300 may include relational databases, object storage, indexes, file systems, etc. Any or all of API server 200, web server 210, and storage 300 can be hosted in the cloud, implemented on dedicated hardware or provided in any other suitable manner.

Client device(s) 100 can represent any computing device that a user may use to interface with system 10. For example, a client device 100 may be a desktop, laptop, tablet, smart phone, etc. In typical implementations, there may be many schools that use system 10, and therefore, there may be many client devices 100 that users associated with such schools use to access system 10.

Figure 2:
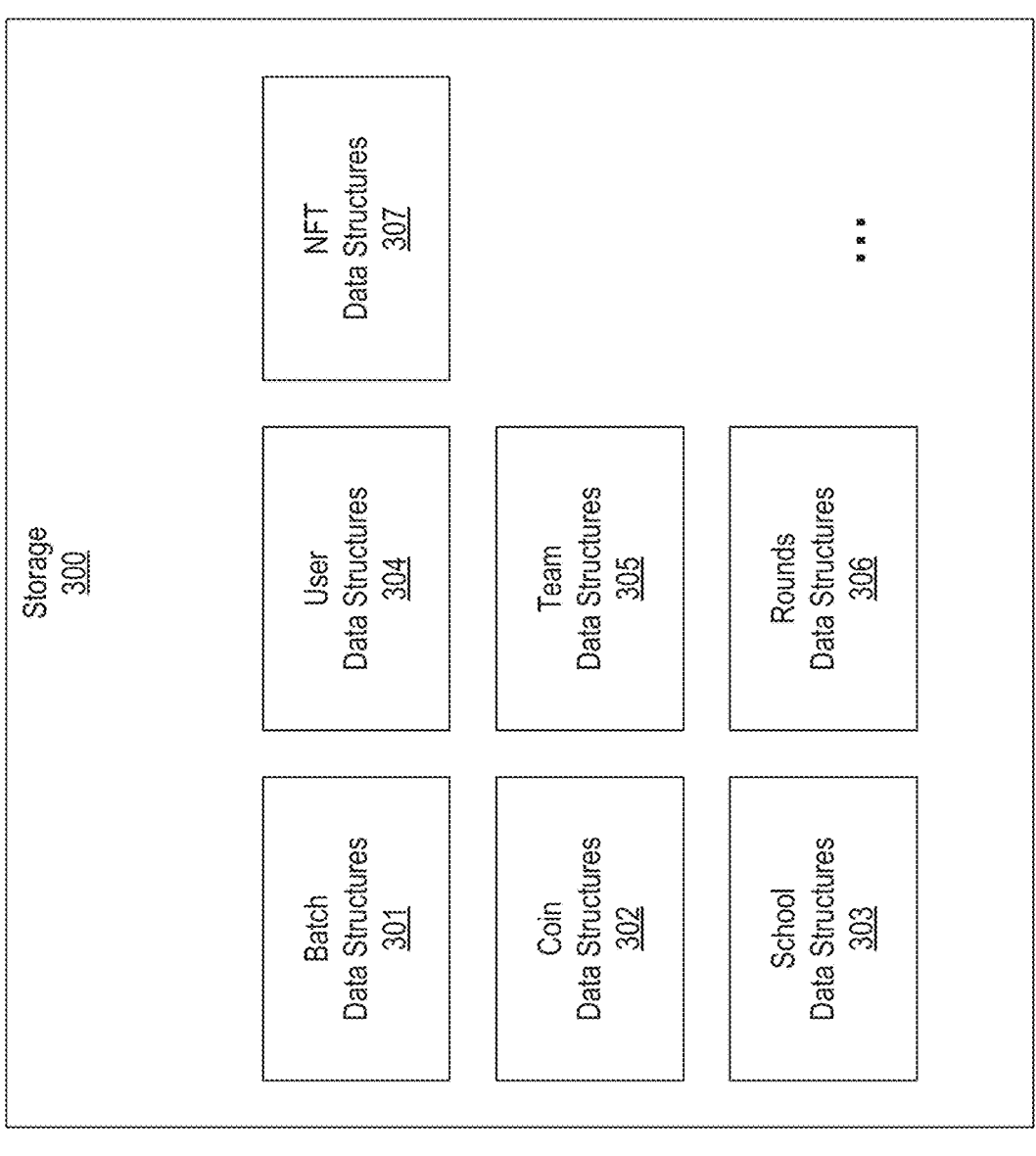
FIG. 2 provides an example of various data structures that may be used in one or more embodiments of the present invention.

FIG. 2 provides an example of various data structures that system 10 may maintain in storage 300 for use in implementing one or more embodiments of the present invention. As an overview, batch data structures 301 may be used to define each batch of coins that schools have created within system 10. Coin data structures 302 may be used to define individual coins. School data structures 303 may be used to define schools. User data structures 304 may be used to define users, such as students, teachers, and admins, within a school. Team data structures 305 may be used to define teams of students within a school. Rounds data structures 306 may be used to define rounds of a game including the scores of teams participating in the rounds. NFT data structures 307 may be used to define off-chain NFTs that have been awarded to students.

Figure 3:
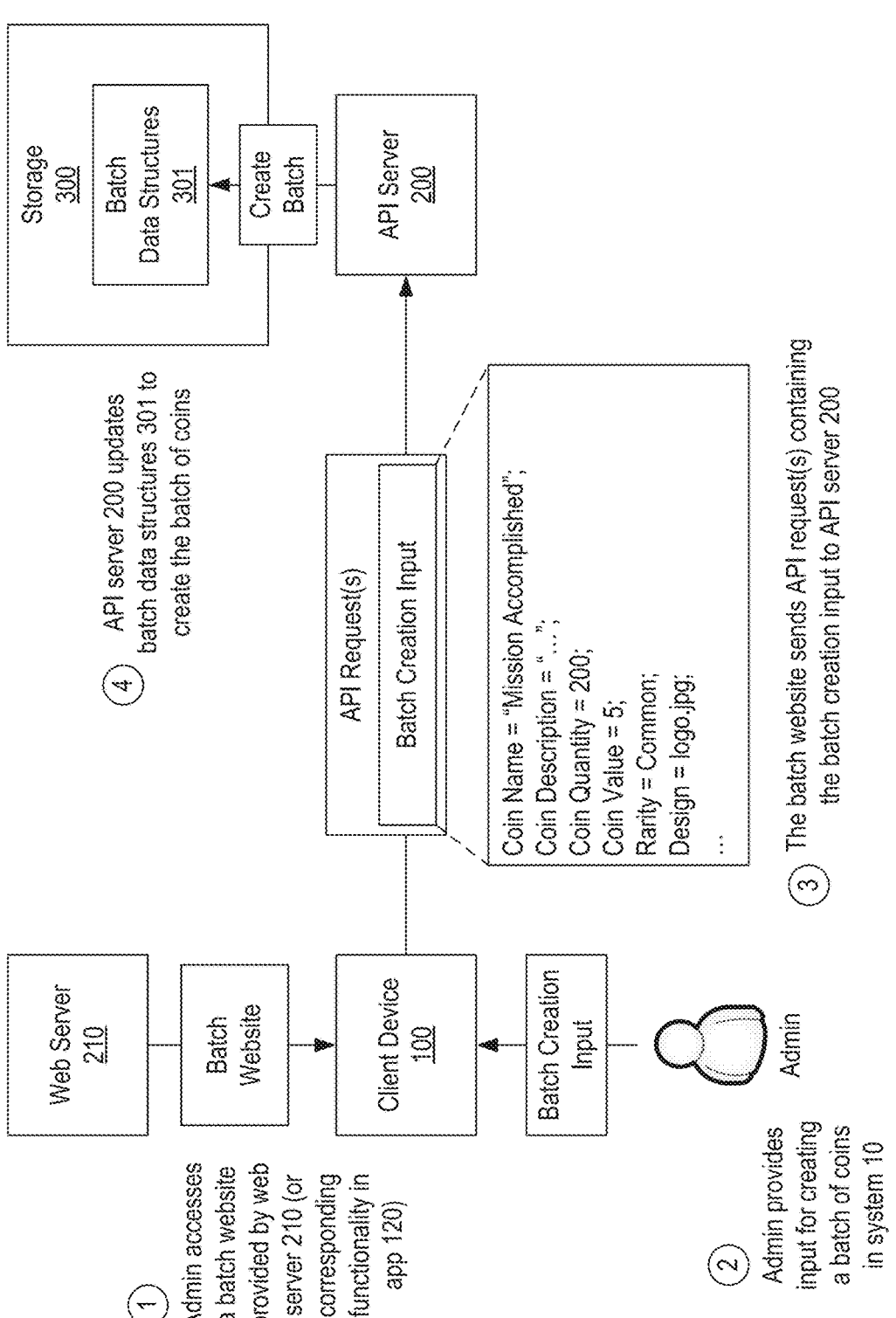
FIG. 3 provides an example of how an admin can create a batch of digital coins that teachers may award to students.

FIG. 3 provides an example of how system 10 may allow an admin to create a batch of coins that teachers can then distribute to students in accordance with one or more embodiments of the present invention. In step 1, the admin may use a browser on client device 100 to access a batch website provided by web server 210. Alternatively, the admin may access corresponding functionality on app 120. In step 2, the admin may provide input for creating a batch of coins in system 10, and in step 3, the batch website (or app 120) can send one or more API requests to API server containing the batch creation input. As shown, this batch creation input may include a name of the coin ("Mission Accomplished"), a coin description (e.g., "You accomplished something great!"), a quantity of coins in the batch (200), a value of each coin in the batch (5), a rarity for the coins (common), a design for the coins (logo.jpg), etc. In step 4, API server 200 can use the batch creation input to update batch data structures 301 to thereby create/define the batch of coins. Although not shown, a batch of coins in batch data structures 301 could be given a unique ID (e.g., BatchID) and associated with a unique identifier of the school (e.g., SchoolID). Once a batch of coins is created within system 10, teachers at the school associated with the batch can be allowed to issue the coins to students.

Figure 4A:
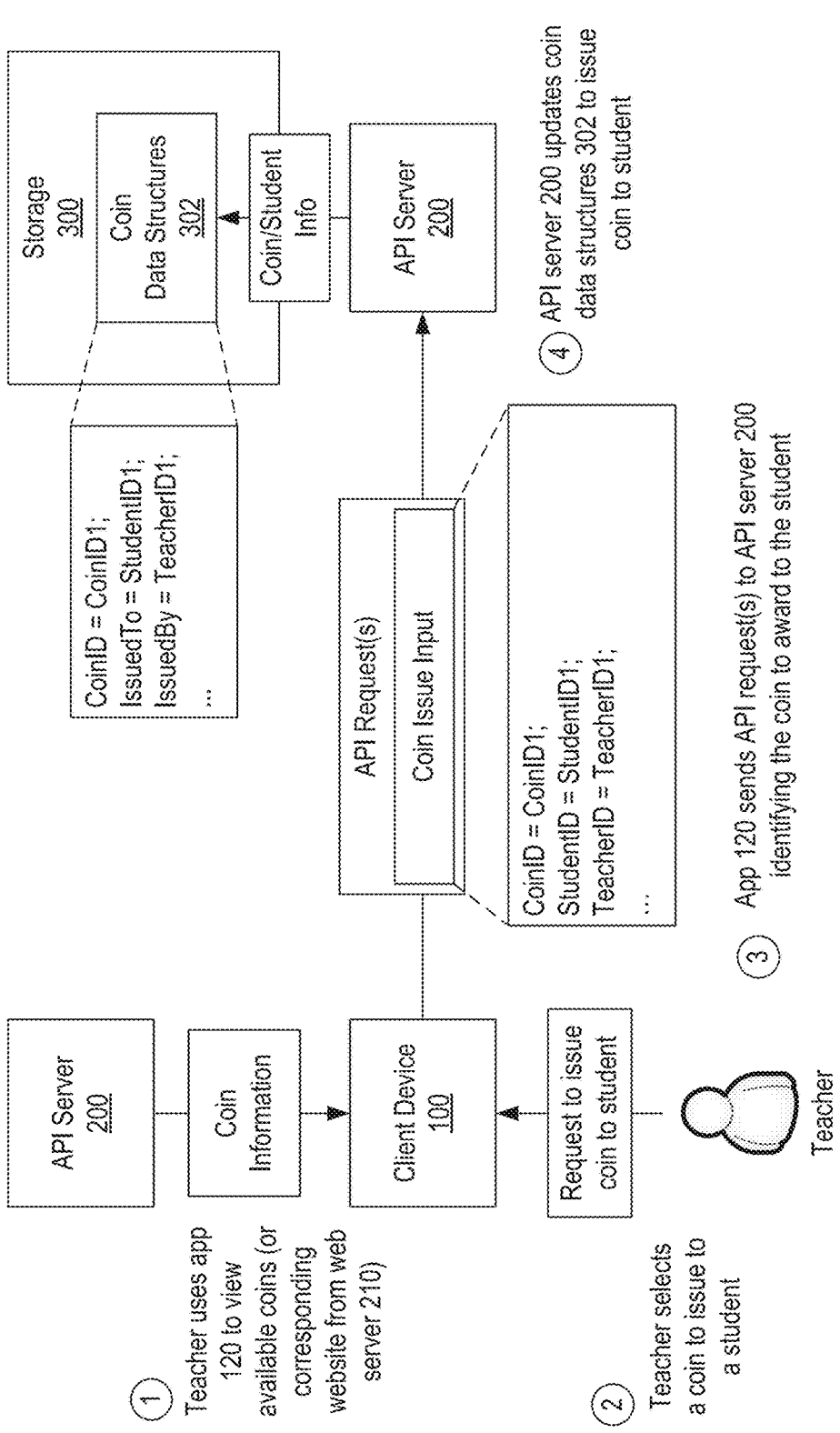
FIGS. 4A and 4B provide an example of how digital coins are awarded to students as part of a round of a game.
Figure 4B:
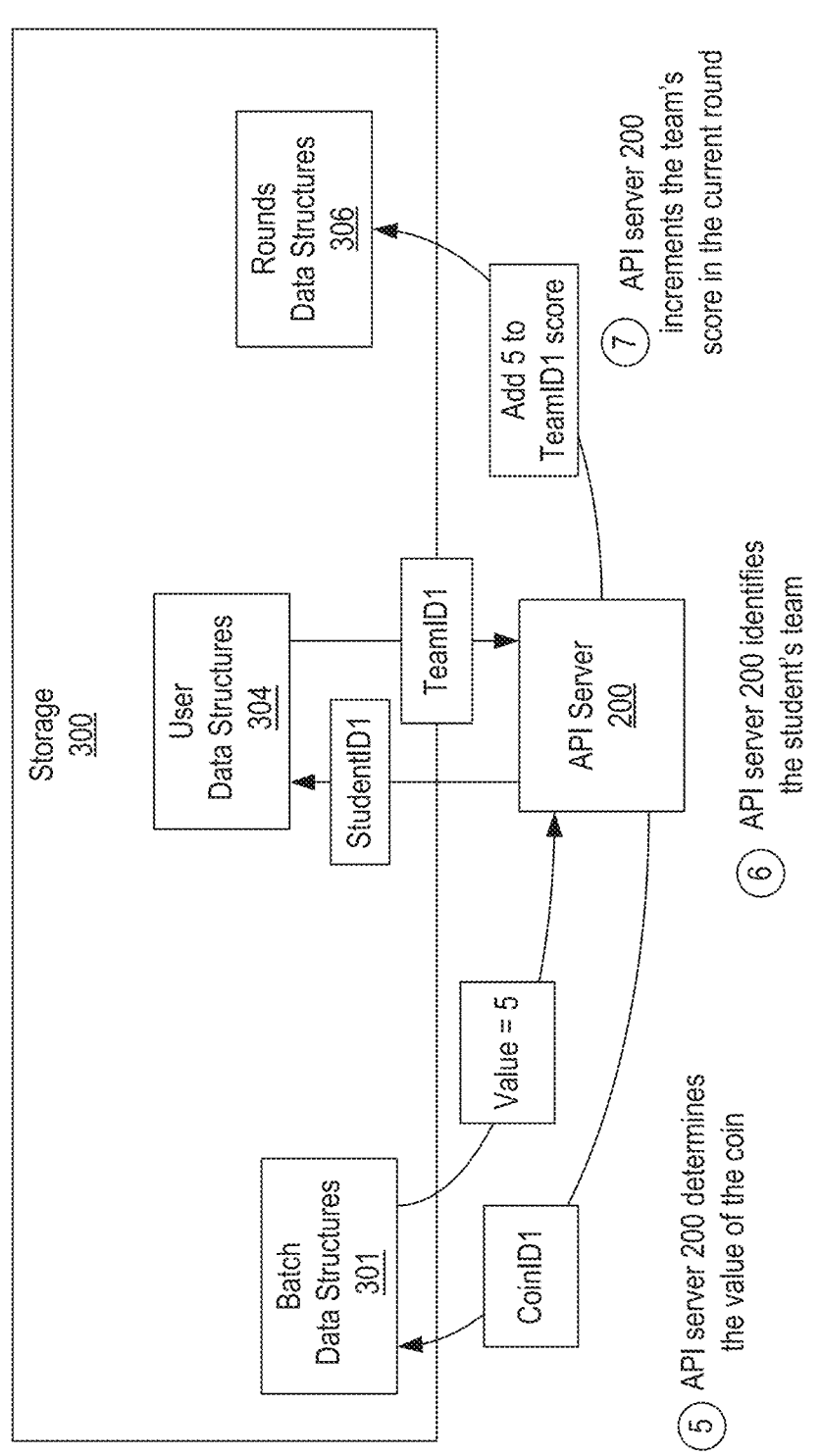

FIGS. 4A and 4B provide an example of how system 10 may allow a teacher to issue a coin to students in accordance with one or more embodiments of the present invention. In step 1, the teacher may use app 120 on client device 100 to view coins that are available to be issued to students. Alternatively, the teacher may access a website provided by web server 210 that allows the teacher to view such coins. In step 2, the teacher can select a coin to issue to a student. For example, app 120 may allow the teacher to select a coin and may then present the teacher with an option to select one or more of his or her students to whom the coin should be issued. In step 3, and in response to the teacher's selection of a coin and a student to whom the coin should be issued, app 120 (or a corresponding website) can send one or more API requests to API server 200 that include coin issue input. Among possibly other things, this coin issue input may include an identifier of the selected coin, the studentID of a selected student, and possibly an identifier of the teacher, which are assumed to be CoinID1, StudentID1, and TeacherID1 in this example. In step 4, API server 200 can use the coin issue input to update coin data structures 302 to define that the coin has been issued to the student. For example, an entry in coin data structures 302 could be created to define that the coin with CoinID1 has been issued to the student with StudentID1 by the teacher which TeacherID1.

Turning to FIG. 4B, in conjunction with issuing a coin to a student, API server 200 can also add the value of the issued coin to the student's team. For example, in step 5, API server 200 can access batch data structures 301 to retrieve the value of the issued coin (e.g., using the CoinID) which in this case is assumed to be 5. In step 6, API server 200 can also access user data structures 304 to identify to which team the student belongs, which in this example is assumed to be the team with TeamID1. In step 7, API server 200 can use the value of the coin and the identified team to increment the identified team's score in the current round. For example, API server 200 could access rounds data structure 306 using TeamID1 to locate and increment the score for TeamID1 by 5. The process represented in FIGS. 4A and 4B can be performed whenever a teacher issues a coin to a student during a game to thereby maintain team scores during the current round of the game. Accordingly, a team score can reflect the values of the coins awarded to the students on the team during the current round.

Figure 5A:
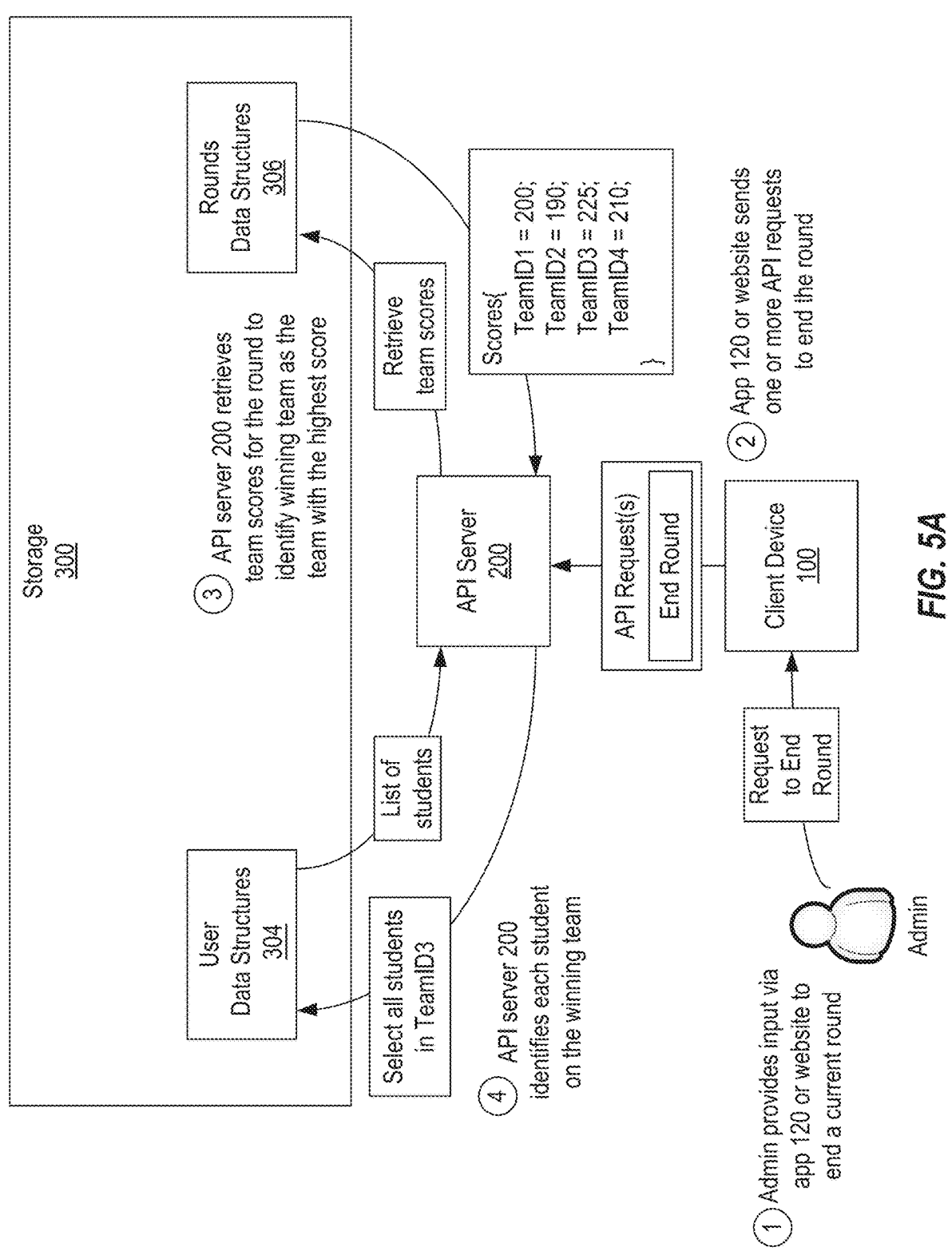
FIGS. 5A and 5B provide an example of how off-chain NFTs can be awarded to students on a winning team.
Figure 5B:
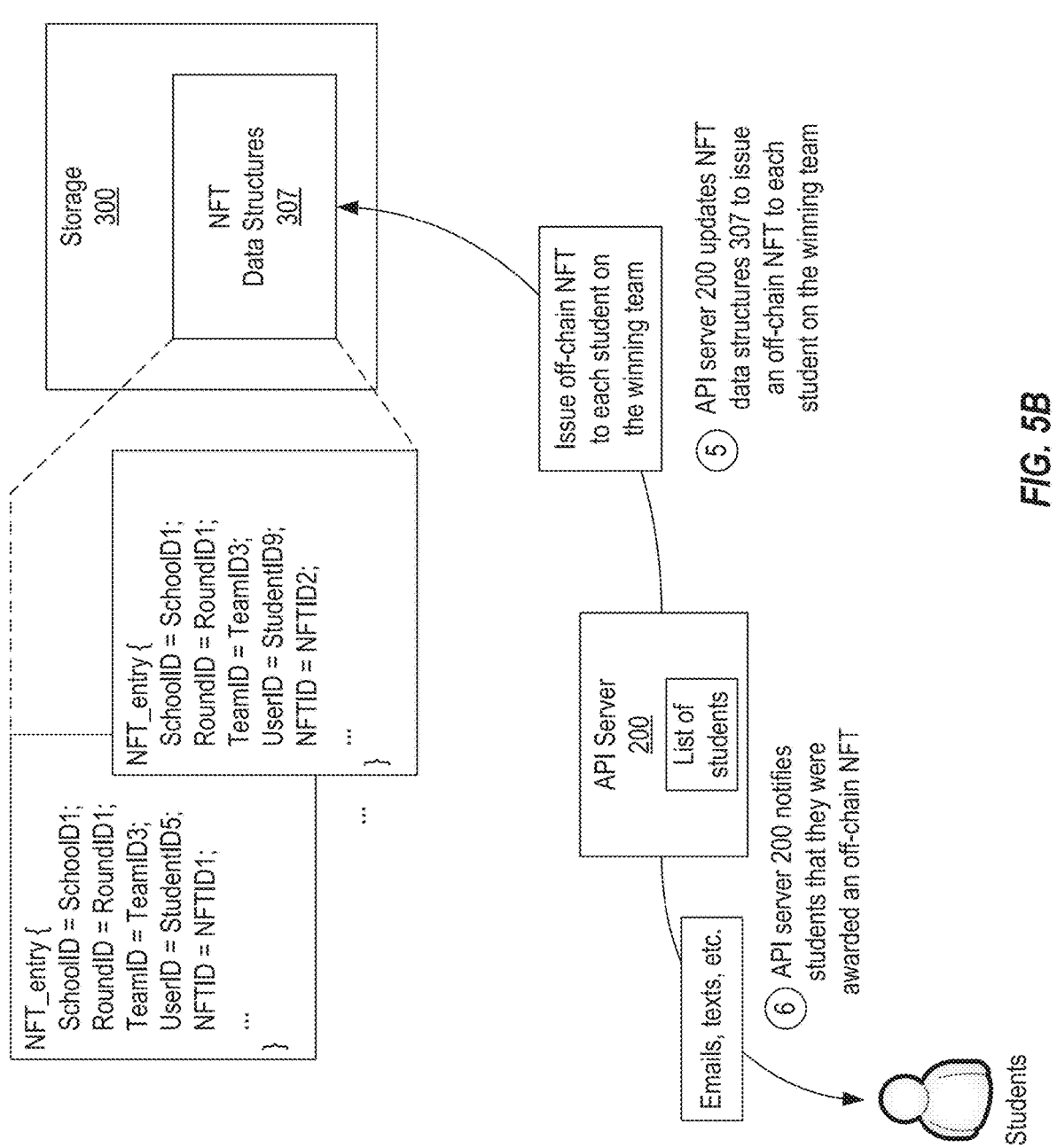

FIGS. 5A and 5B provide an example of how system 10 may allow an admin to end a round of a game and thereby trigger the awarding of off-chain NFTs to students on a winning team. In step 1, the admin may provide input via app 120 or a corresponding website to end the current round. In step 2, app 120 or the corresponding website may send one or more API requests to API server 200 to thereby request the ending of the current round. Although not shown, this request may include an identifier of the round (e.g., RoundID1) and the SchoolID, among possibly other identifiers. In step 3, API server 200 can access rounds data structures 306 to retrieve the team scores for the current round (e.g., using the RoundID and SchoolID) to thereby identify a winning team as the team with the highest score for the round. In this example, it is assumed that the team with TeamID3 has the highest score. In step 4, API server 200 can use the identifier of the winning team (TeamID3) to query user data structures 304 to identify each student on the winning team. For example, an entry for a student in user data structures 304 may store the TeamID of the team to which the student is currently assigned in association with the student's StudentID.

Turning to FIG. 5B, in step 5, API server 200 may issue off-chain NFTs to each student on the winning team. For example, using the list of students obtained in step 4, API server 200 could create an NFT_entry in NFT data structures 307 to define an NFT that is awarded to the student. As shown, an NFT_entry may associate the StudentID of the student who is awarded the NFT with an identifier of the NFT and possibly with the SchoolID, RoundID, and TeamID.

In some embodiments, API server 200 may randomly award NFTs to the students on the winning team. For example, an off-chain NFT to be awarded to a particular student may be randomly selected from among multiple types of off-chain NFTs (e.g., having different designs and/or values). For example, in FIG. 5B, it is assumed that the NFTs with IDs of NFTID1 and NFTID2 were randomly selected to be awarded to the students with IDs of StudentID5 and StudentID9 respectively. Once an off-chain NFT is awarded to a student, the student may view the off-chain NFT using app 120 and/or a corresponding web site.

Notably, the process of awarding the off-chain NFTs to students is transparent to the admin, the teachers, and the students. In particular, the admin defines the coins, the teachers award the coins, and the students receive the coins, all without needing to understand how the off-chain NFTs are created or awarded once a round is completed. This abstraction of the off-chain NFTs from the coins enables NFTs to be integrated into an educational environment to encourage student engagement without requiring a technical understanding of NFTs.

In some embodiments, system 10 enables a student to redeem an off-chain NFT that the student has been awarded for a corresponding on-chain NFT. In such embodiments, system 10 can employ a smart contract that allows the student to obtain the on-chain NFT while abstracting the technical complexities of the blockchain. System 10 can also implement a voucher mechanism that ensures that the student can only obtain an on-chain NFT for an off-chain NFT that the student has been awarded.

Figure 6:
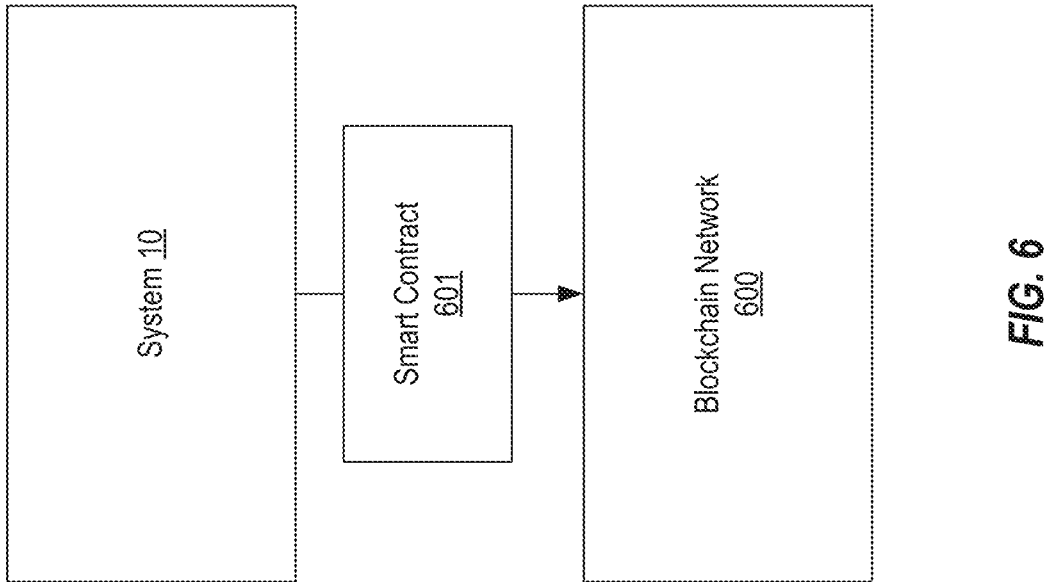
FIG. 6 provides an example of how a smart contract can be deployed for use when a student redeems an off-chain NFT for an on-chain NFT.

FIG. 6 represents that system 10 (e.g., API server 200 or another component) can deploy a smart contract 601 to a blockchain network 600 (e.g., to a node of the blockchain) to enable smart contract 601 to be used when students attempt to redeem an off-chain NFT for an on-chain NFT. Smart contract 601 can be leveraged to authenticate a student's request to redeem an off-chain NFT for an on-chain NFT such as to confirm that the student has been awarded the off-chain NFT and has not previously redeemed it for an on-chain NFT.

Figure 7A:
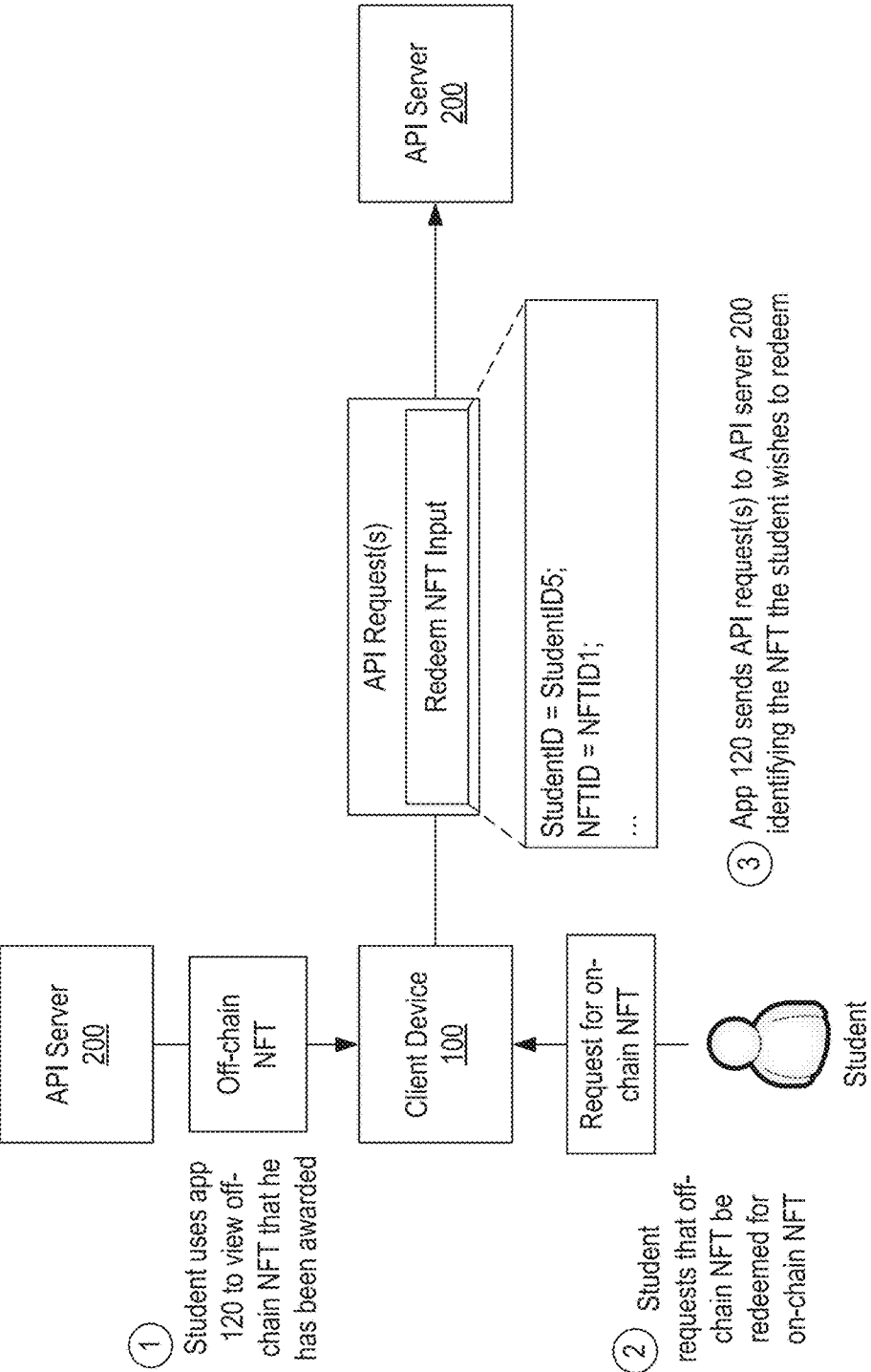
FIGS. 7A-7G provide an example of how an off-chain NFT can be redeemed for an on-chain NFT.

FIGS. 7A-7G provide an example of how system 10 enables a student to redeem an off-chain NFT for an on-chain NFT using smart contract 601. Turning to FIG. 7A, in step 1, the student may use app 120 or a corresponding website to view off-chain NFTs that he has been awarded. In step 2, it is assumed that the student provides input to app 120 requesting that an off-chain NFT be redeemed for an on-chain NFT. In step 3, app 120 may send one or more API requests to API server 200 to request redemption of the off-chain NFT. As shown, the redeem NFT input that such API request(s) may contain can include the student's ID and the off-chain NFT's ID which are assumed to be StudentID5 and NFTID1 in this example.

Figure 7B:
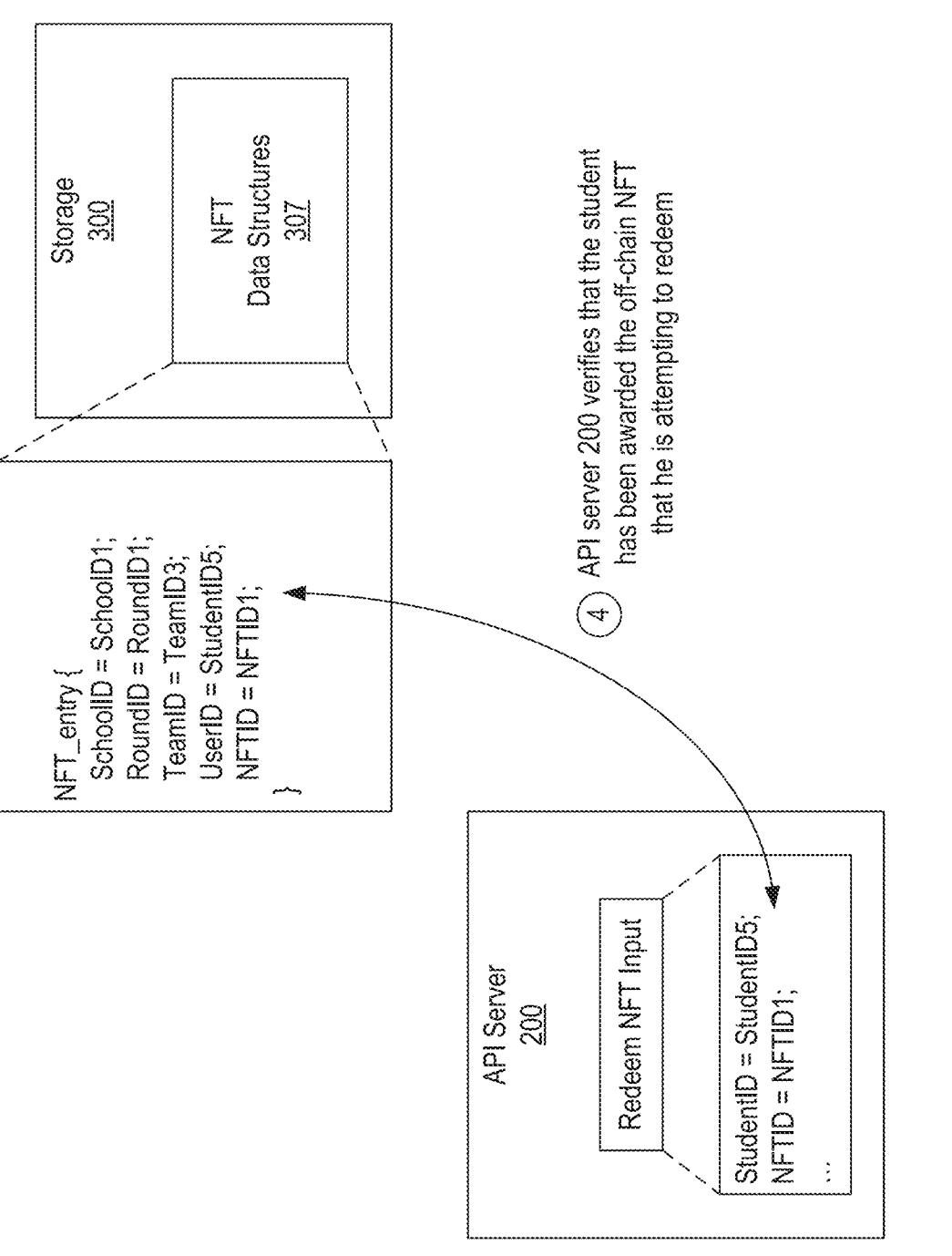

Turning to FIG. 7B, in step 4, API server 200 can verify that the student has been awarded the off-chain NFT that he is attempting to redeem. For example, API server 200 could query NFT data structures 307 using NFTID1 to determine whether an NFT_entry that includes StudentID5 and NFTID1 exists. In this example, API server 200 will confirm that the off-chain NFT having the ID of NFTID1 has been awarded to the student having the ID of StudentID5.

Figure 7C:
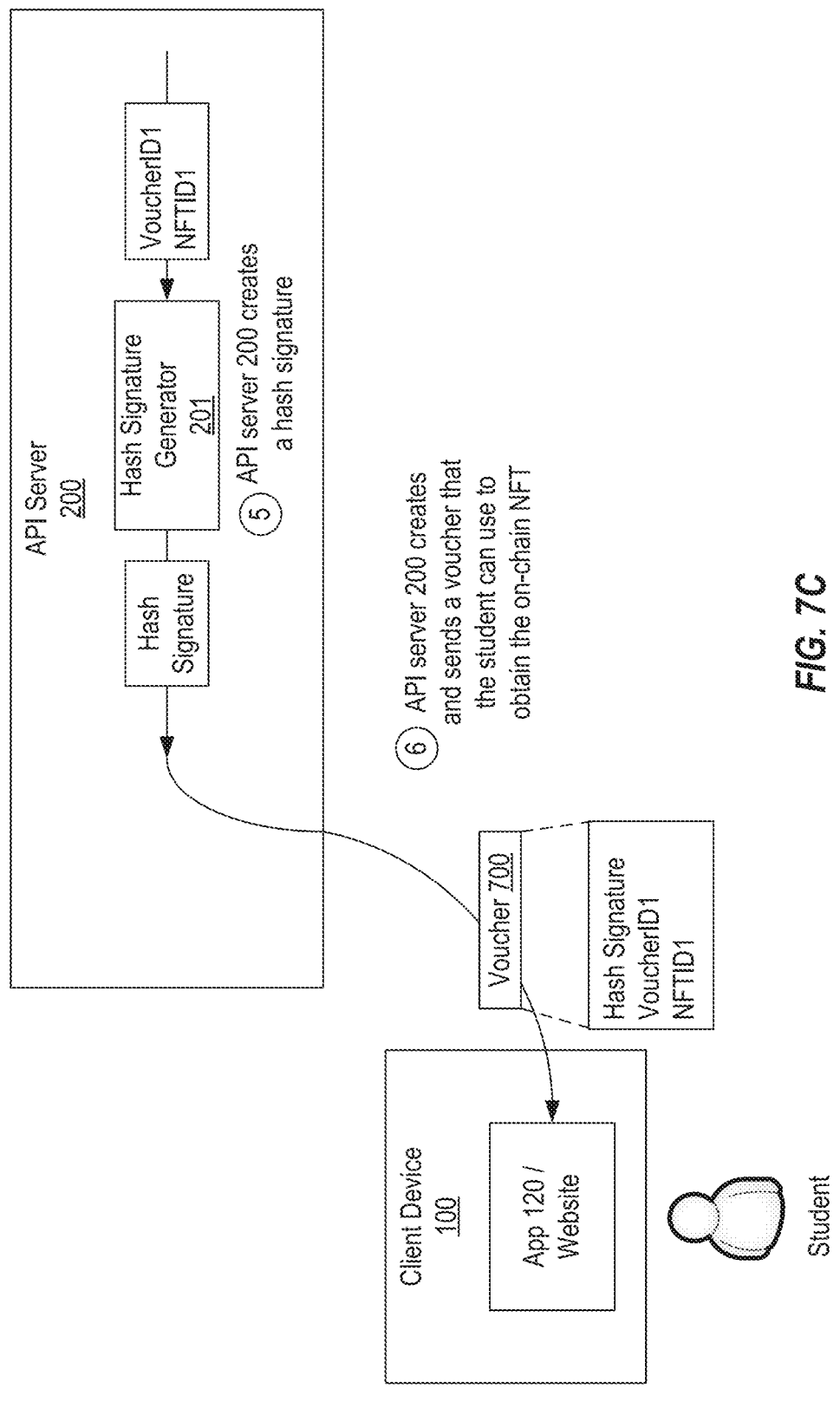

FIG. 7C represents how API server 200 can create a voucher 700 to be used when a student request's redemption of an off-chain NFT for an on-chain NFT. In step 5, API server 200 can employ a hash signature generator 201 to create a hash signature to be included in voucher 700. This hash signature may be created from parameters relating to the redemption of the off-chain NFT such as the NFTID of the NFT to be redeemed and an ID for the voucher itself, among possibly other information. In this example, it is assumed that VoucherID1 and NFTID1 are the parameters that hash signature generator 201 uses to generate a hash. Hash signature generator 201 may then use a cryptographic key (e.g., its private key) to create a hash signature from the hash. Then, in step 6, API server 200 can send voucher 700, which can include the hash signature and the parameters (VoucherID1 and NFTID1) used to create the hash signature, to app 120.

Figure 7D:
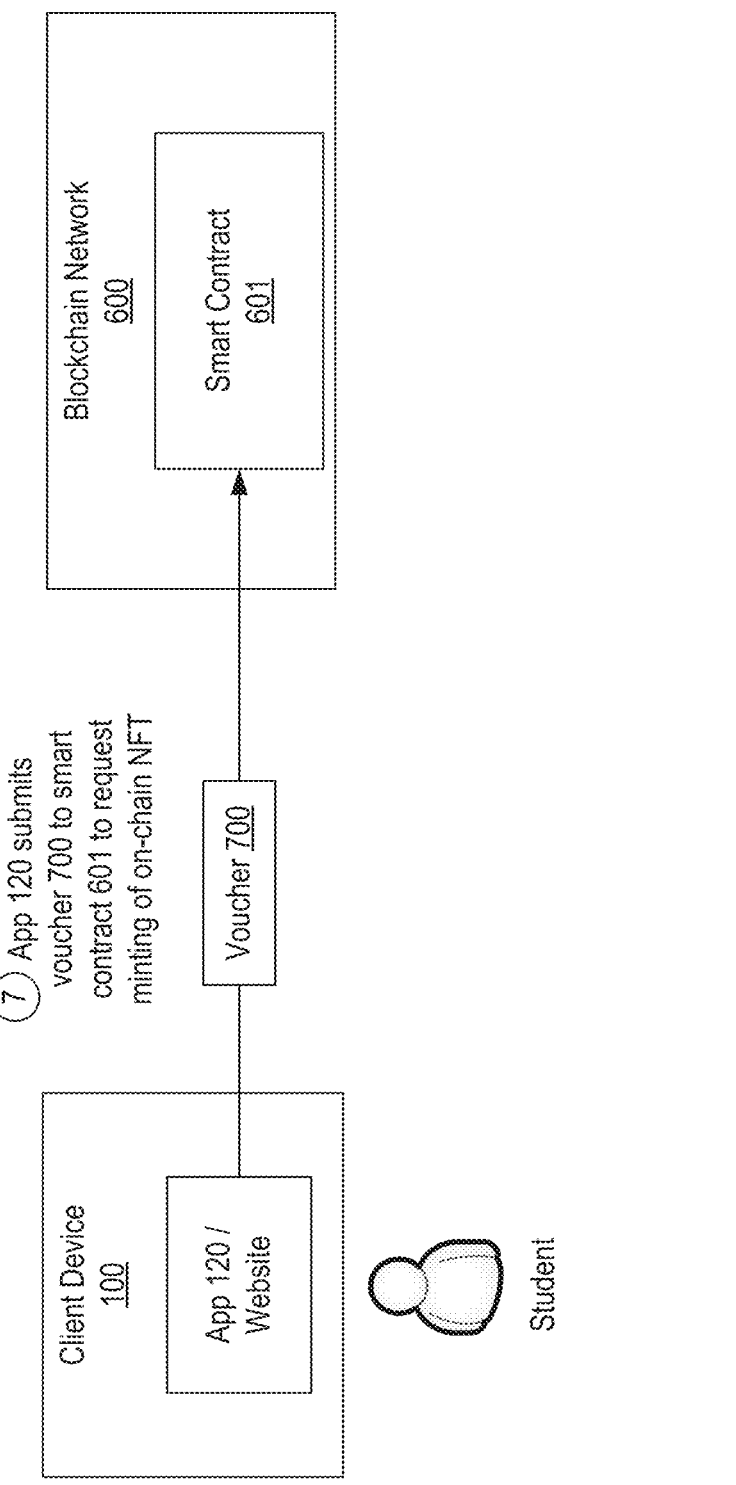

Turning to FIG. 7D, in step 7, app 120 can submit voucher 700 to smart contract 601 to request the minting of the on-chain NFT and its issuance to the student. For example, app 120 may be configured to invoke web3 method(s) to pass voucher 700 to smart contract 601.

Figure 7E:
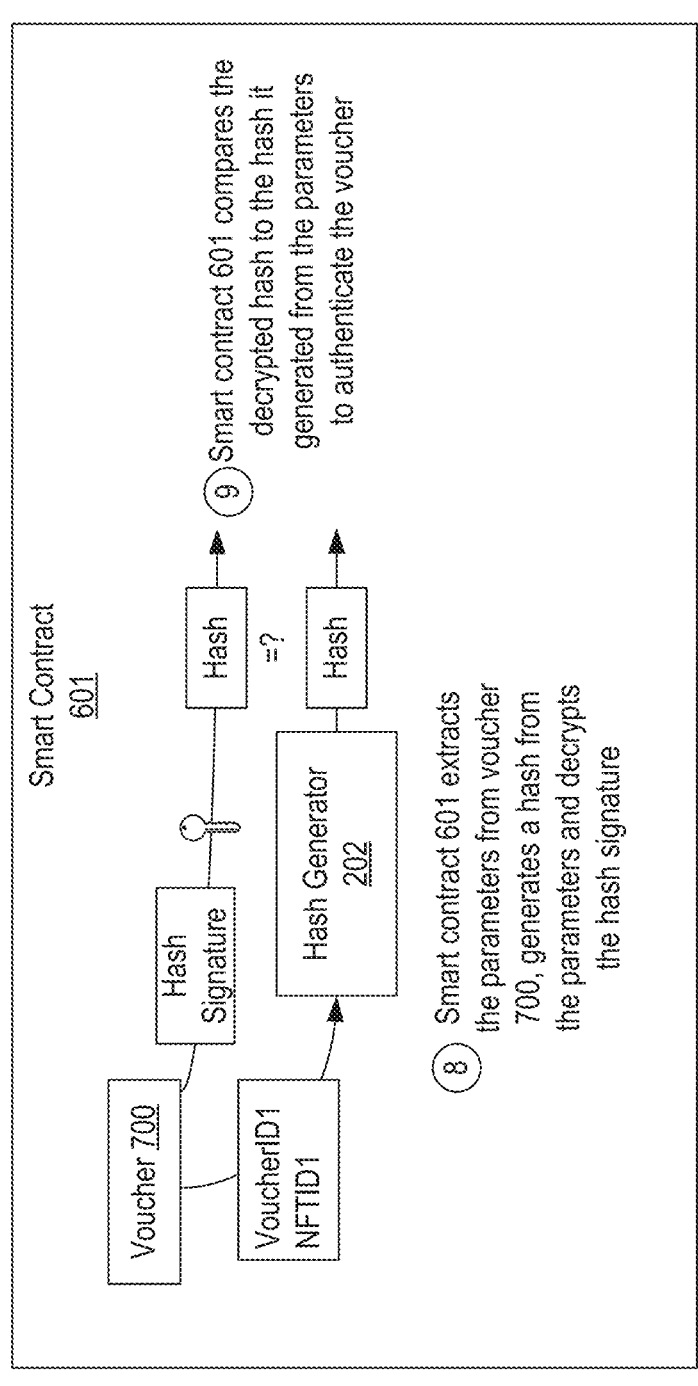

FIG. 7E represents how smart contract 601 can process voucher 700 to authenticate it (i.e., to verify that the student is entitled to mint the on-chain NFT). In step 8, smart contract 601 can extract the parameters (VoucherID1 and NFTID1) from voucher 700 and use them to generate a hash (e.g., via a hash generator 202 corresponding to hash signature generator 201) and can also extract the hash signature from voucher 700 and decrypt it (e.g., using the corresponding public key). In step 9, smart contract 601 can compare the decrypted hash to the hash it generated from the parameters to determine if they match to thereby authenticate voucher 700.

Figure 7F:
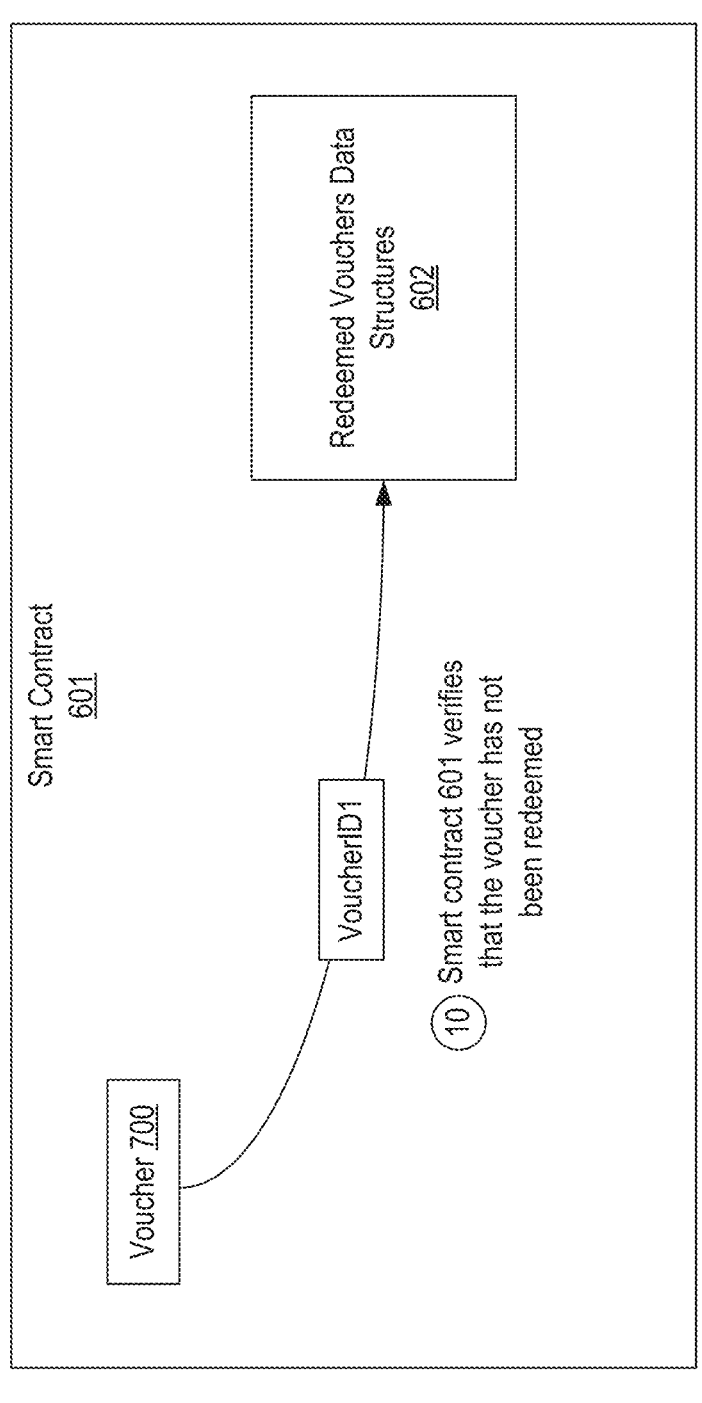

Turning to FIG. 7F, if smart contract 601 authenticates voucher 700, in step 10, it may also confirm that the student has not already redeemed the off-chain NFT for an on-chain NFT. For example, smart contract 601 may maintain redeemed vouchers data structures 602 which identify vouchers that have already been redeemed. In such cases, smart contract 601 may use the voucher ID in voucher 700 (VoucherID1) to query redeemed vouchers data structures 602 for a matching entry. If no match exists, smart contract 601 can know that the off-chain NFT represented by the voucher ID has not yet been redeemed. Notably, this verification can facilitate the issuance of multiple copies of the same off-chain NFT having the same NFT ID given that the voucher ID may uniquely identify a particular instance of the off-chain NFT that has been awarded to a particular student.

Figure 7G:
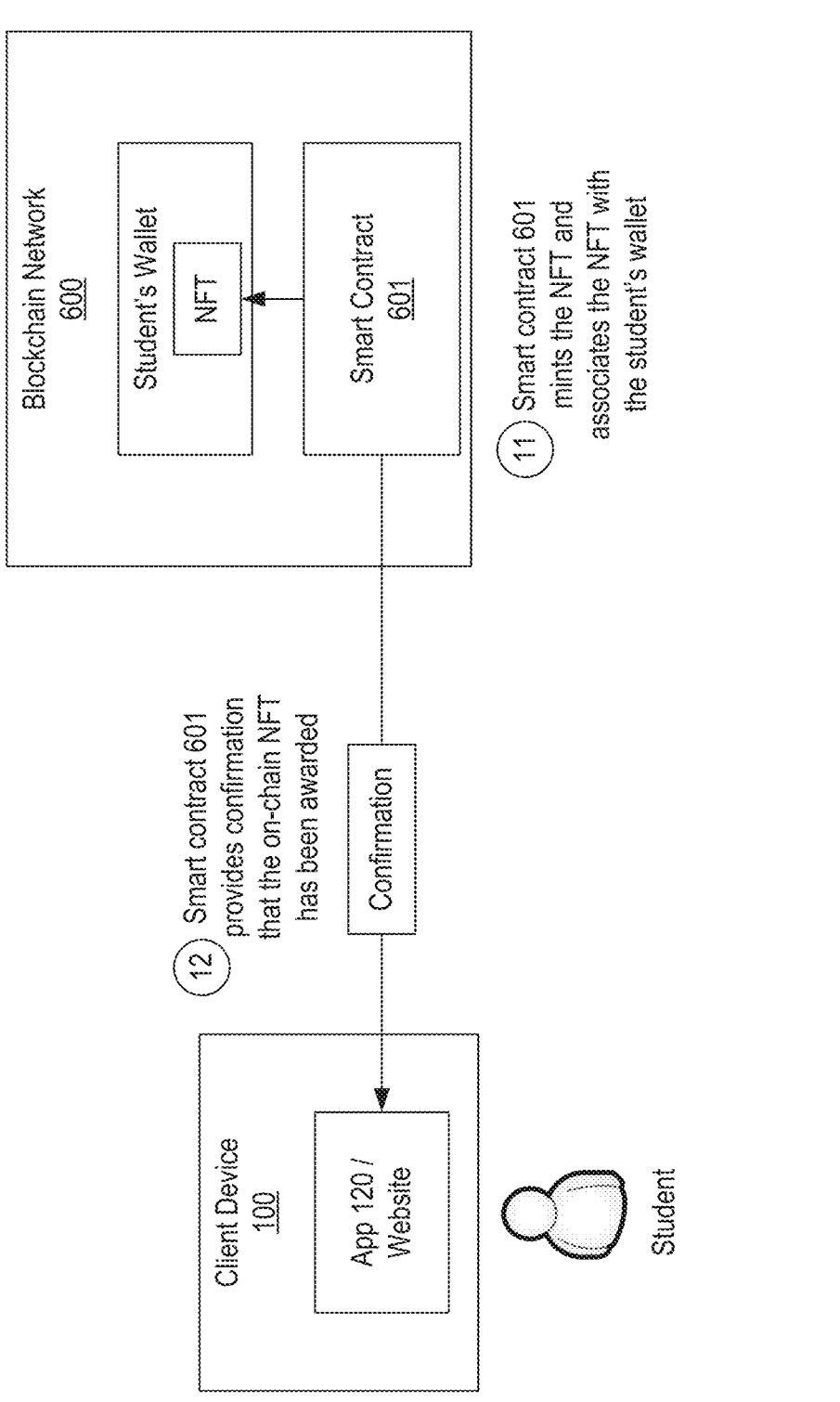

Turning to FIG. 7G, and assuming each of the verifications has been completed successfully, in step 11, smart contract 601 can mint the on-chain NFT and associate it with the student's wallet. Although not shown, the information for identifying the student's wallet may be defined in user data structures 304 (or associated data structures) and provided as part of step 7 in FIG. 7D. Finally, in step 12, smart contract 601 may provide confirmation to app 120 that the on-chain NFT was successfully minted and associated with the student's wallet. At this point, the student will own the on-chain NFT and will be able to access it via his wallet.

As FIGS. 7A-7G confirm, the process for redeeming an off-chain NFT for an on-chain NFT can be implemented without requiring smart contract 601 to have access to system 10 thus largely abstracting the process from the student. For example, the student would only need to have a wallet that he has associated with his account with system 10. Even with this lack of integration with system 10, smart contract 601 can still ensure that students are unable to mint on-chain NFTs that they have not earned. In particular, by providing vouchers and by configuring smart contract 601 to operate on such vouchers, system 10 prevents students from obtaining an on-chain NFT unless they have been awarded a corresponding off-chain NFT and have not yet redeemed it.

By abstracting the technical details of NFTs, both off-chain and on-chain, system 10 provides an effective way to use NFTs to encourage student engagement in an educational environment. Due to its configuration, system 10 can provide such benefits in distributed networking environments such as when remote learning is required.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a system that implements an educational environment, for integrating non-fungible tokens (NFTs) into the educational environment by providing an off-chain abstraction mechanism for distributing the NFTs, the method comprising:

creating and deploying a smart contract to a blockchain network that exists outside of the educational environment, the smart contract being configured to authenticate a student's request to redeem an off-chain NFT that does not exist on the blockchain network for an on-chain NFT that exists on the blockchain network;

creating, by an API server of the system, coins within the educational environment that one or more teachers may award to students as part of the students' participation in the educational environment;

independent of the awarding of the coins by the one or more teachers to a first group of the students within the educational environment, determining, by the API server, that each of the students in the first group are to be awarded an off-chain NFT within the educational environment, the first group including a first student, each off-chain NFT to be awarded having a unique identifier within the educational environment;

in response to the determination, awarding, by the API server, the off-chain NFTs to each of the students in the first group, wherein awarding the off-chain NFTs includes associating the unique identifier of each off-chain NFT with an identifier of the corresponding student such that a first off-chain NFT that has a first unique identifier is awarded to the first student by associating the first unique identifier with an identifier of the first student;

receiving, by the API server and from a client device that the first student uses, a request to redeem the first off-chain NFT for a first on-chain NFT;

creating, by the API server and within the educational environment, a voucher for the off-chain NFT, the voucher comprising a voucher identifier, the first unique identifier for the first off-chain NFT, and a hash signature generated from the voucher identifier and the first unique identifier for the first off-chain NFT;

providing, by the API server, the voucher to the client device;

receiving, at the smart contract that has been deployed to the blockchain network, the voucher from the client device;

verifying, by the smart contract, the voucher using the hash signature, the voucher identifier and the first unique identifier for the first off-chain NFT; and in response to verifying the voucher, minting, by the smart contract, the first on-chain NFT and associating the first on-chain NFT with a wallet of the first student that exists outside the educational environment such that the first on-chain NFT is awarded to the first student outside of the educational environment.

2. The method of claim 1, wherein the hash signature is encrypted in the voucher, and verifying the voucher comprises:

decrypting the hash signature to generate a first hash;

creating a second hash from the voucher identifier and the first unique identifier for the first off-chain NFT that are included in the voucher; and confirming that the first hash matches the second hash.

3. The method of claim 1, further comprising:

determining, by the smart contract, that the voucher identifier has not previously been used to mint an on-chain NFT.

4. The method of claim 1, wherein determining, by the API server, that each of the students in the first group are to be awarded an off-chain NFT within the educational environment comprises:

determining that the students in the first group belongs to a team in an educational environment that received a highest value of coins in a round of a game.

5. The method of claim 1, wherein each of the off-chain NFTs to be awarded is randomly selected.

6. One or more computer storage media storing computer executable instructions, which when executed in a system that implements an educational environment, implement a method for integrating non-fungible tokens (NFTs) into the educational environment by providing an off-chain abstraction mechanism for distributing the NFTs, the method comprising:

creating and deploying a smart contract to a blockchain network that exists outside of the educational environment, the smart contract being configured to authenticate a student's request to redeem an off-chain NFT that does not exist on the blockchain network for an on-chain NFT that exists on the blockchain network;

creating, by an API server of the system, coins within the educational environment that one or more teachers may award to students as part of the students' participation in the educational environment;

independent of the awarding of the coins by the one or more teachers to a first group of the students within the educational environment, determining, by the API server, that each of the students in the first group are to be awarded an off-chain NFT within the educational environment, the first group including a first student, each off-chain NFT to be awarded having a unique identifier within the educational environment;

in response to the determination, awarding, by the API server, the off-chain NFTs to each of the students in the first group, wherein awarding the off-chain NFTs includes associating the unique identifier of each off-chain NFT with an identifier of the corresponding student such that a first off-chain NFT that has a first unique identifier is awarded to the first student by associating the first unique identifier with an identifier of the first student;

receiving, by the API server and from a client device that the first student uses, a request to redeem the first off-chain NFT for a first on-chain NFT;

creating, by the API server and within the educational environment, a voucher for the off-chain NFT, the voucher comprising a voucher identifier, the first unique identifier for the first off-chain NFT, and a hash signature generated from the voucher identifier and the first unique identifier for the first off-chain NFT;

providing, by the API server, the voucher to the client device;

receiving, at the smart contract that has been deployed to the blockchain network, the voucher from the client device;

verifying, by the smart contract, the voucher using the hash signature, the voucher identifier and the first unique identifier for the first off-chain NFT; and in response to verifying the voucher, minting, by the smart contract, the first on-chain NFT and associating the first on-chain NFT with a wallet of the first student that exists outside the educational environment such that the first on-chain NFT is awarded to the first student outside of the educational environment.

7. The computer storage media of claim 6, wherein the first group of students form a winning team in a game in the educational environment.

8. The computer storage media of claim 7, wherein the winning team is determined based on the awarding of the coins.

9. The computer storage media of claim 6, wherein the hash signature is encrypted in the voucher, and verifying the voucher comprises:

decrypting the hash signature to generate a first hash;

creating a second hash from the voucher identifier and the first unique identifier for the first off-chain NFT that are included in the voucher; and confirming that the first hash matches the second hash.

10. The computer storage media of claim 6, wherein the method further comprises:

determining, by the smart contract, that the voucher identifier has not previously been used to mint an on-chain NFT.

* * * * *